(12) United States Patent
Helmer et al.

(10) Patent No.: US 6,376,574 B1
(45) Date of Patent: *Apr. 23, 2002

(54) FAST HARDENING AQUEOUS COATING COMPOSITION AND PAINT

(75) Inventors: Bradley J. Helmer; James W. Young, Jr., both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,412

(22) Filed: May 8, 2000

Related U.S. Application Data

(63) Continuation of application No. 08/968,921, filed on Nov. 6, 1997, now Pat. No. 6,075,079, which is a continuation of application No. 08/375,325, filed on Nov. 18, 1995, now abandoned.

(51) Int. Cl.$^7$ .......................... C08K 5/16; C08L 51/00; C08L 33/02; F21V 7/22
(52) U.S. Cl. ....................... 523/172; 524/236; 524/253; 524/529; 524/556; 525/329.9
(58) Field of Search ..................... 523/172; 524/236, 524/253, 529, 556

(56) References Cited

U.S. PATENT DOCUMENTS

| | | |
|---|---|---|
| 3,639,327 A | 2/1972 | Drelich et al. ............. 260/29.6 |
| 3,806,485 A | 4/1974 | Frisque .................... 260/29.6 |
| 3,843,585 A | 10/1974 | Kangas et al. ............. 260/29.7 |
| 4,049,869 A | 9/1977 | De Long ................... 428/413 |
| 4,054,717 A | 10/1977 | Gill et al. ................. 428/452 |
| 4,082,884 A | 4/1978 | De Long ................... 428/262 |
| 4,087,397 A | 5/1978 | Martorano et al. ......... 260/29.6 |
| 4,104,228 A | 8/1978 | Meyer et al. .............. 260/29.6 |
| 4,119,600 A | 10/1978 | Bakule et al. ............. 260/29.6 |
| 4,199,400 A | 4/1980 | Bakule et al. ............. 162/146 |
| 4,255,310 A | 3/1981 | Oppenlaender et al. .... 260/29.6 |
| 4,293,476 A | 10/1981 | Moore et al. .............. 523/410 |
| 4,520,143 A | 5/1985 | Jellinek .................... 524/253 |
| 4,839,198 A | 6/1989 | Lonis et al. ............... 427/137 |
| 4,980,404 A | 12/1990 | Aydin et al. ............... 524/100 |
| 5,544,972 A | 8/1996 | Boldt ........................ 404/75 |
| 5,672,379 A | 9/1997 | Schall et al. ............... 427/137 |
| 5,705,560 A | 1/1998 | Takarabe et al. ............ 524/556 |
| 5,804,627 A | 9/1998 | Landy et al. ............... 524/556 |
| 5,820,993 A | 10/1998 | Schall et al. ............... 428/447 |
| RE36,042 E | 1/1999 | Landy et al. ............... 524/521 |
| 5,861,188 A | 1/1999 | Schall et al. ............... 427/137 |
| 6,075,079 A * | 6/2000 | Helmer et al. .............. 524/253 |

FOREIGN PATENT DOCUMENTS

| | | |
|---|---|---|
| EP | 0 066 108 B1 | 5/1982 |
| EP | 0 066 108 A1 | 5/1982 |
| EP | 322 188 | 12/1988 |
| EP | 0 409 459 | 7/1990 |
| EP | 0 525 977 | 6/1992 |
| JP | 5159928 | 5/1976 |
| WO | 92 17543 | 10/1992 |

* cited by examiner

Primary Examiner—Tae H. Yoon

(57) ABSTRACT

The invention relates to a fast hardening aqueous coating composition comprising from about 95 to about 99 weight percent of an anionically stabilized aqueous emulsion of a copolymer having a Tg of from about 0° C. to about 40° C., the copolymer containing two or more ethylenically unsaturated monomers, wherein from 0 to about 4 weight percent of the monomers are α,β-ethylenically unsaturated aliphatic carboxylic acid monomers; from about 0.2 to about 5 weight percent of a polyimine having a molecular weight of from about 250 to about 20,000; and from about 0.2 to about 5 weight percent of a volatile base, wherein the composition has a pH from about 8 to about 11, and wherein a cast film of the composition has a hardening rate measurement rating of at least 5 within 20 minutes after casting under ambient conditions of temperature up to 30° C. and relative humidity no less than 50 percent. Within the scope of the invention are a process for the preparation of a fast hardening aqueous coating composition, a fast hardening aqueous traffic paint, and a fast hardening migration resistant binder for composites.

47 Claims, No Drawings

FAST HARDENING AQUEOUS COATING COMPOSITION AND PAINT

This Application is a continuation of prior application Ser. No. 08/968,921 filed on Nov. 6, 1997, now U.S. Pat. No. 6,075,079, which is a continuation of prior application Ser. No. 08/375,325, filed on Jan. 18, 1995, now abandoned.

BACKGROUND OF THE INVENTION

1. Field of the Invention

This invention relates to a fast hardening aqueous coating composition which can be utilized in applications where it is desirable to form a hard, smear-resistant, non-tracking surface very quickly after deposit of the coating under ambient conditions. In particular, the invention relates to fast hardening aqueous traffic marking paint, which forms a hard, smear-resistant surface very soon after application under ambient conditions to a surface, such as a roadway, and which allows the resumption of normal traffic with minimal interruption.

2. Description of the Related Art

Conventional traffic marking paints have been required to provide hard, durable surfaces that will stand up to rough treatment from road traffic, and also to dry as fast as possible under ambient conditions, so that any diversion of traffic from the roadway is, minimized. These and other conventional fast dry systems have used volatile organic solvent (VOC) based compositions which are easy to apply and which evaporate quickly to leave the desired hard, smear-resistant coating. However, unless contained, the organic solvent used in these coatings evaporates into the environment, and, in the case of traffic paint, containment is not feasible. As the volume of fast drying compositions used increases, the release of VOC's into the environment becomes increasing costly and ever less desirable. Suitable water based fast drying compositions would be very desirable.

The drying of conventional water based compositions depends upon the evaporation of water from the composition. This is generally quite slow in comparison to the drying of an organic solvent based system due to the much higher heat of vaporization of water in comparison to typical organic solvents.

Generally, three techniques have been used to accelerate the drying of traffic paint. The paint may be heated as it is applied. Alternatively, the paint may be formulated at very high solids, thereby decreasing the amount of water in the paint which must evaporate.

A third, less common approach is to cause the paint to harden before all of the water is gone. In this case, the paint may have the appearance, feel, and non-tracking characteristics of dry paint, even though significant water remains in the composition. This approach uses what, in reality, is a fast hardening paint composition.

U.S. Pat. Nos. 4,119,600 and 4,199,400 disclose migration resistant binders useful in bonding non-woven fibers to form composites, which binders can be prepared from (a) an anionically stabilized latex, (b) a water soluble polymer containing a plurality of amine groups formed from at least one ethylenically unsaturated monomer, and (c) a volatile base.

EP Patent Application 409,459 discloses and claims an aqueous coating composition comprising an anionically stabilized polymer latex, a polyfunctional amine polymer and a volatile base. This composition is described as quick drying.

EP Patent 066,108 discloses a road marking material based on an aqueous plastic dispersion which is free of organic solvents.

EP Patent Application 525,977 discloses and claims a waterborne paint for traffic marking comprising a multipolymer micellar system.

PCT Application WO 92/17543 discloses post-extended anionic acrylic dispersions intended for use as a base coat of a multi-layer automotive coating, which are formed by the reaction of carboxylic acid groups of an acrylic resin with an organic compound having at least two oxirane groups.

U.S. Pat. No. 3,639,327 discloses an improved adhesive system which employs a small amount of polyethylenimine as a cationic zeta potential agent in a latex composition.

U.S. Pat. Nos. 4,049,869 and 4,082,884 disclose a composition consisting of an aqueous solution or dispersion of a carboxylated hydrophilic acrylic polymer, a crosslinking agent for the polymer, and an ultraviolet absorbing agent.

U.S. Pat. No. 3,806,485 discloses a stable liquid dispersion of a water soluble anionic vinyl addition polymer and a water soluble cationic polymer such as an alkylene polyamine.

U.S. Pat. No. 4,980,404 discloses one-component adhesives for adhesive bonds having increased high-temperature strengths containing aqueous dispersions of carboxyl-containing polyacrylates and organic polyamino compounds having a molecular weight of from 250 to 15,000 and an amino functionality greater than 5.

Japanese Patent disclosure J51059928 discloses a coating composition comprising a cationic polymer electrolyte such as polyethylene imine and an ammonium or organic amine salt of a copolymer dispersion.

The prior art provides only partial solutions to the problems in this area, especially, in the area of fast drying compositions. It is desirable in a composition for many uses that it be fast drying and water based, so that it may replace alkyl based systems with their unacceptably high release of VOC's. Low viscosity of the composition and high water resistance of the coating produced from the composition are also desirable, as is commercial availability of all of the ingredients necessary for production of the composition.

In the area of traffic marking paint, it would be desirable to have economical water based compositions that harden quickly enough for traffic to be routed over them soon after application, and which provide superior characteristics, such as increased water resistance, in the finished coatings produced therefrom.

SUMMARY OF THE INVENTION

The objects of the present invention are to provide a coating and binder system that is water based and low in VOC's, one that hardens very quickly and that provides the resilience and smear-resistance of a dry coating while in the hard state before it has become significantly dehydrated. Hardening of the coating system is achievable under ambient conditions without elevated temperatures or other extraordinary means.

The present invention is related to a fast hardening aqueous coating composition comprising:

(a) from about 95 to about 99 weight percent, based on the weight of dry materials in the composition, of an anionically stabilized aqueous emulsion of a copolymer having a Tg of from about 0° C. to about 40° C., the copolymer comprising in polymerized form a polymerization mixture containing two or more ethylenically unsaturated monomers, wherein, based on the total weight of all ethylenically unsaturated monomers in the polymerization mixture, from 0 to about 4 weight percent of the monomers are α,β-ethylenically unsaturated aliphatic carboxylic acid monomers;

(b) from about 0.2 to about 5 weight percent of a polyimine having a molecular weight of from about 250 to about 20,000; and (c) from about 0.2 to about 5 weight percent of a volatile base;

wherein the composition has a pH from about 8 to about 11, and wherein a cast film of the composition has a hardening rate measurement rating of at least 5 within 20 minutes after casting under ambient conditions of temperature up to 30° C. and relative humidity no less than 50 percent.

This invention further relates to an aqueous coating composition comprising:

(a) from about 95 to about 99 weight percent, based on the weight of dry materials in the composition, of an anionically stabilized aqueous emulsion of a copolymer having a Tg of from about 0° C. to about 40° C., the copolymer comprising in polymerized form a polymerization mixture containing two or more ethylenically unsaturated monomers, wherein, based on the total weight of all ethylenically unsaturated monomers in the polymerization mixture, from 0 to about 4 weight percent of the monomers are α,β-ethylenically unsaturated aliphatic carboxylic acid monomers;

(b) from about 0.2 to about 5 weight percent of a polyimine having a molecular weight of from about 250 to about 20,000; and (c) from about 0.2 to about 5 weight percent of a volatile base;

wherein the composition has a pH from about 8 to about 11, and wherein a pigment-containing formulation prepared from the composition has a no track time according to ASTM D711-84 of 20 minutes or less.

In another embodiment, the invention relates to a process for the preparation of a fast hardening aqueous coating composition comprising:

(1) preparing from about 95 to about 99 weight percent, based on the weight of dry materials in the composition, of an anionically stabilized aqueous emulsion of a copolymer having a Tg of from about 0° C. to about 40° C., the copolymer comprising in polymerized form a polymerization mixture containing two or more ethylenically unsaturated monomers, wherein, based on the total weight of all ethylenically unsaturated monomers in the polymerization mixture, from 0 to about 4 weight percent of the monomers are α,β-ethylenically unsaturated aliphatic carboxylic acid monomers;

(2) adding from about 0.2 to about 5 weight percent of a volatile base to the emulsion from (1) so that the pH of emulsion is in the range from about 8 to about 11;

(3) mixing with the product from (2) from about 0.2 to about 5 weight percent of a polyimine having a molecular weight of from about 250 to about 20,000;

wherein the composition has a pH from about 8 to about 11, and wherein a cast film of the composition has a hardening rate measurement rating of at least 5 within 20 minutes after casting under ambient conditions of temperature up to 30° C. and relative humidity no less than 50 percent.

Within the scope of this invention is an embodiment relating to a fast hardening aqueous traffic paint comprising:

(1) a fast hardening aqueous coating composition comprising:

(a) from about 95 to about 99 weight percent, based on the weight of dry materials in the composition, of an anionically stabilized aqueous emulsion of a copolymer having a Tg of from about 0° C. to about 40° C., the copolymer comprising in polymerized form a polymerization mixture containing two or more ethylenically unsaturated monomers, wherein, based on the total weight of all ethylenically unsaturated monomers in the polymerization mixture, from 0 to about 4 weight percent of the monomers are α,β-ethylenically unsaturated aliphatic carboxylic acid monomers;

(b) from about 0.2 to about 5 weight percent of a polyimine having a molecular weight of from about 250 to about 20,000; and (c) from about 0.2 to about 5 weight percent of a volatile base;

(2) an organic or inorganic pigment;

wherein the paint has a no track time according to ASTM D711-84 of 20 minutes or less.

In another embodiment, this invention relates to a fast hardening aqueous migration-resistant binder composition comprising:

(1) a fast hardening aqueous coating composition comprising:

(a) from about 95 to about 99 weight percent, based on the weight of dry materials in the composition, of an anionically stabilized aqueous emulsion of a copolymer having a Tg of from about 0° C. to about 40° C., the copolymer comprising in polymerized form a polymerization mixture containing two or more ethylenically unsaturated monomers, wherein, based on he total weight of all ethylenically unsaturated monomers in the polymerization mixture, from 0 to about 4 weight percent of the monomers are α,β-ethylenically unsaturated aliphatic carboxylic acid monomers;

(b) from about 0.2 to about 5 weight percent of a polyimine having a molecular weight of from about 250 to about 20,000; and (c) from about 0.2 to about 5 weight percent of a volatile base; and (2) an organic filler, an inorganic filler, an organic fiber, an inorganic fiber, or a mixture thereof.

DESCRIPTION OF THE PREFERRED EMBODIMENTS

THE COPOLYMER

The fast hardening aqueous coating composition of this invention comprises at least about 90 weight percent up to about 99.6 weight percent, preferably from about 95 to about 99 weight percent based on the weight of dry materials of an anionically stabilized aqueous emulsion of a copolymer comprising in polymerized form two or more ethylenically unsaturated monomers, desirably a copolymer having a Tg of from about 0° C. to about 40° C. The word "dry" means substantially in the absence of water. The copolymer can be prepared by any convenient method of polymerization including aqueous or nonaqueous emulsion polymerization, solution polymerization, suspension or inverse suspension polymerization, dispersion polymerization or bulk polymerization.

However, for use in the compositions of this invention aqueous emulsion polymerization is a preferred method of production of the copolymer. This method also has the advantage of directly providing an anionically stabilized aqueous emulsion of the copolymer, whereas copolymers produced by other methods must be redispersed. The copolymer in the form of an anionically stabilized aqueous emulsion is typically referred to as a latex.

"Glass transition temperature," or "$T_g$" as used herein means the glass transition temperature of a polymer as calculated by the Fox equation [*Bulletin of American Physics Society* 1, 3, page 123 (1956)]:

$$\frac{1}{Tg} = \frac{w_1}{Tg_{(1)}} + \frac{w_2}{Tg_{(2)}}$$

For a copolymer, $w_1$ and $w_2$ refer to the weight fraction of the two comonomers and Tg(1) and Tg(2) refer to the glass transition temperature of the two corresponding homopolymers. In actual practice with a real copolymer comprising in polymerized form a polymerization mixture containing two or more ethylenically unsaturated monomers, and especially when there are more than two monomers present, calculated Tg's are only a general indication of the actual Tg.

The copolymers useful alone in the practice of this invention desirably have a glass transition temperature (Tg) no lower than about −10° C., preferably at least about 0° C. Desirably, the Tg of the copolymer is no higher than about 50° C., preferably up to about 40° C. The generally preferred range is from about 0° C. to about 40° C. The Tg of the copolymer of the composition of this invention in practice is determined by differential scanning calorimetry (DSC).

The copolymer comprises in polymerized form a polymerization mixture containing two or more ethylenically unsaturated monomers. While a wide range of monomeric compositions are useful for the copolymeric component of the fast hardening aqueous coating composition of this invention, in a particular embodiment it is preferred that the content of α,β-ethylenically unsaturated aliphatic carboxylic acid monomers in the copolymer is no more than about 5 weight percent, desirably up to about 4 weight percent, more desirably up to about 3 weight percent, preferably up to about 2 weight percent, and more preferably up to about 1 weight percent.

When present, the content of α,β-ethylenically unsaturated aliphatic carboxylic acid monomers in the copolymer is desirably at least about 0.2 weight percent, more desirably at least about 0.3 weight percent, preferably at least about 0.4 weight percent, and more preferably at least about 0.5 weight percent.

In preferred embodiments, the content of α,β-ethylenically unsaturated aliphatic carboxylic acid monomers in the copolymer is desirably in the range from 0 to about 4 weight percent, more preferably from about 0.2 to about 3 weight percent, still more preferably from about 0.3 to about 2 weight percent, still more preferably from about 0.4 to about 1 weight percent, where the weight percentages are basked on the total weight of monomers in the polymerization mixture. In a highly preferred embodiment of this invention, the copolymer contains either no α,β-ethylenically unsaturated aliphatic carboxylic acid monomers or is very low therein, generally in the range from 0 to about 0.5 weight percent.

In a desirable embodiment of the instant invention, the copolymeric component of the fast hardening aqueous coating composition is non-carboxylated. In a preferred aspect of this embodiment, the copolymer consists essentially of (meth)acrylate monomers.

While a wide range of monomeric compositions are useful for the copolymeric component of the fast hardening aqueous coating composition of this invention, in a particular embodiment it is preferred that the copolymer is uncrosslinked by virtue of there being no crosslinking monomers present in the group of ethylenically unsaturated monomers present in the polymerization mixture from which it is prepared. That is, it is desirable in this embodiment that the copolymer be produced by polymerization in the absence of crosslinking monomers or some other crosslinking agent. It is also preferable in this embodiment that there be no other source of covalent crosslinking in the fast hardening aqueous coating composition.

In an alternative embodiment, it is desirable for the copolymer itself to be lightly crosslinked. This may be accomplished by the inclusion in the polymerization mixture from which the copolymer is prepared of a monomer which is multifunctional and of known utility as a crosslinker, such as, for example, divinyl benzene or allyl (meth)acrylate. In this particular embodiment, it is preferred that the content of crosslinking monomers in the copolymer is no more than about 2 weight percent, preferably from 0.001 to 2 weight percent, more preferably from 0.01 to 1.5 weight percent, still more preferably from 0.1 to 1 weight percent, where the weight percentages are based on the total weight of monomers in the polymerization mixture.

MONOMERS

A wide variety of monomers may be used to prepare copolymers suitable for use in the composition of this invention. One desirable type of copolymer is the (meth)acrylate copolymers comprising primarily (meth)acrylate monomers.

As used herein the term "(meth)acrylate copolymer" means a copolymer which contains in polymerized form at least 80 weight percent (meth)acrylate monomers and (meth)acrylic acid monomers. In a preferred embodiment, the copolymer contains in polymerized form at least 90 weight percent (meth)acrylate monomers and (meth)acrylic acid monomers, while even more preferred is the embodiment wherein the copolymer contains in polymerized form at least 95 weight percent (meth)acrylate monomers and (meth)acrylic acid monomers.

In a highly preferred embodiment, the copolymer is a pure (meth)acrylate, or a pure (meth)acrylate except for the inclusion of a non-(meth)acrylate seed therein. These copolymers desirably consist essentially of (meth)acrylate monomers, or of (meth)acrylate monomers and (meth)acrylic acid monomers.

The term "(meth)acrylate monomers" is meant to include those monomers which are used to prepare the (meth)acrylate copolymers which are suitable for use in the compositions of this invention. Included therein are conventionally known acrylates, such as, for example, alkyl esters of acrylic acid, represented by the formula $CH_2=CHCOOR$, and methacrylic acid, represented by the formula $CH_2=CCH_3COOR$, where R is a hydrocarbyl or a substituted hydrocarbyl group containing from 1 to 16 carbon atoms. The term "(meth)acrylic acid monomers" is meant to include acrylic acid, methacrylic acid and substituted derivatives thereof.

The term "(meth)acrylate monomers" as used herein is meant also to include the monovinyl acrylate and methacrylate monomers. The (meth)acrylates can include esters, amides and substituted derivatives thereof. Generally, the preferred (meth)acrylates are $C_1$–$C_8$ alkyl acrylates and methacrylates.

Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

Monomers suitable for use as components in polymers are often classified as "hard" or "soft" monomers, depending upon the glass transition temperature ($T_g$) of the homopolymer prepared from the monomer. As used herein, a hard monomer is characterized as having a Tg greater than 40° C. for its homopolymer, while a soft monomer is characterized as having a Tg of 40° C. or less for its homopolymer. A preferred hard (meth)acrylate monomer is methyl methacrylate.

The soft non-functional (meth)acrylate monomers have the formula:

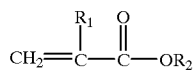

wherein $R_1$ is selected from the group consisting of hydrogen and methyl, and $R_2$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. Butyl acrylate is a preferred soft, non-functional monomer.

Suitable non-ester monomers which are sometimes classified with the (meth)acrylates are the nitrites. A preferred nitrile monomer is acrylonitrile.

While the more highly preferred embodiment of the (meth)acrylate copolymer of the instant invention may contain up to about 5 weight percent of other comonomers which are not (meth)acrylate monomers, other embodiments may contain as other comonomers as much as 10 weight percent or even as much as 20 weight percent of monomers which are not (meth)acrylate monomers. Other monomers which are useful in these copolymers of the instant invention include vinyl aromatic monomers, aliphatic conjugated diene monomers, monoethylenically unsaturated carboxylic acid monomers, vinyl acetate monomer, vinylidene halide monomer and vinyl halide monomer. In some other desirable copolymers suitable for use in this invention, the monomers of the polymerization mixture include from 1 to about 40 weight percent of one or more (meth)acrylate monomers.

As used in the specification and claims, "vinyl aromatic monomers" are defined as any organic compound containing at least one aromatic ring and at least one aliphatic-containing moiety having vinyl unsaturation. Preferred vinyl aromatic monomers are represented by the following formula:

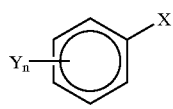

wherein X is an aliphatic group containing at least one double bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted vinyl group. Preferred substituents on the vinyl group are halogen radicals, such as, for example, chloride. However, the most preferred vinyl group is unsubstituted, that is, a hydrocarbon, and contains only one olefinic unsaturation. Vinyl is the most preferred X.

Y is an organic or inorganic group. As used throughout the specification and claims, the term "organic group" means any group containing at least one carbon atom, and the term "inorganic group" means any group devoid of carbon atoms. When n is 2 or more, Y can be the same or different. If organic, Y generally contains from 1 to about 15 carbon atoms and, preferably, is an aliphatic group. Even more preferably, Y is a saturated aliphatic group. If inorganic, Y is preferably a halogen. Exemplary Y substituents include halo and cyano groups and substituted and unsubstituted alkyl groups of 1 to about 10 carbon atoms. Preferred Y substituents are chloride and unsubstituted alkyl groups of 1 to about 6 carbon atoms. Y is more preferably a chloride group or a $C_1$ to about $C_4$ unsubstituted alkyl group.

Illustrative vinyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. The preferred vinyl aromatic monomers are styrene and vinyltoluene; and due to its commercial availability and low cost, styrene is the more preferred vinyl aromatic monomer.

The term "conjugated diene monomer", as used herein, is meant to include compounds such as 1,3-butadiene, isoprene, 1,3-pentadiene, 2-ethyl-1,3-butadiene, and 4-methyl-1,3-pentadiene, 2-methyl-1,3-butadiene, piperylene (1,3-pentadiene), and other hydrocarbon analogs of 1,3-butadiene. The preferred alkadiene monomer is 1,3-butadiene. Other monomers inclusive as aliphatic conjugated dienes are halogenated compounds, such as, for example, 2-chloro-1,3-butadiene.

The monomers of the vinyl group, such as, for example, "vinylidene halides" and "vinyl halides", are suitable for inclusion in the copolymer of this invention, and include, for example, vinylidene chloride and vinyl chloride, which are highly preferred. Vinylidene bromides and vinyl bromide can also be employed. Another vinyl monomer within the vinyl group is vinyl acetate.

Suitable α,β-ethylenically unsaturated aliphatic carboxylic acid monomers are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid or salt form (—COOM in which M represents hydrogen or a metal, such as, for example, ammonium, sodium or potassium) and are readily interconvertible by well known simple procedures.

Specific examples of the α,β-ethylenically unsaturated aliphatic carboxylic acids are acrylic acid, methacrylic acid, fumaric acid, itaconic acid, maleic acid, aconitic acid, various α-substituted acrylic acids such as α-ethacrylic acid, α-propyl acrylic acid and α-butyl acrylic acid. Highly preferred acid monomers are acrylic acid and methacrylic acid.

With regard to the amount of acid monomer which is desirable or preferred in the copolymer as discussed above, it appears that there is a trade-off in terms of the acid strength of the monomer as indicated by pKa in aqueous solution and the amount of the acid monomer desirably included in the copolymer. While a higher acid content can be tolerated and may be desirable for relatively weak acid monomers, for those acid monomers that are relatively stronger acid monomers, the acid content of the copolymer is desirably less.

Within the scope of this invention are other embodiments wherein the copolymer utilized would not be classified as a (meth)acrylate copolymer. Other copolymer types which can be utilized include, for example, combinations of vinyl aromatic monomers with (meth)acrylate monomers, such as, for example, the styrene acrylates, and of vinyl aromatic monomers with conjugated diene monomers, such as, for example, styrene butadiene copolymers. These copolymers may be non-carboxylated or carboxylated.

In an important embodiment of this invention, the aqueous coating composition comprises an anionically stabilized aqueous emulsion of a copolymer comprising in polymerized form a polymerization mixture, wherein the monomers of the polymerization mixture include from about 1 to 100 weight percent of one or more (meth)acrylate monomers, from about 0.1 to about 4 weight percent of one or more (meth)acrylic acid monomers, from about 1 to 100 weight percent of one or more ethylenically unsaturated monomers which are not (meth)acrylate monomers or α,β-ethylenically unsaturated aliphatic carboxylic acid monomers, from about 0.1 to 4 weight percent of one or more α,β-ethylenically unsaturated aliphatic carboxylic acid monomers which are not (meth)acrylic acid monomers, or a mixture thereof.

A particularly desirable polymer with a preferred Tg for use in the instant invention can be obtained from the polymerization of the monomers of a polymerization mixture wherein the polymerized mixture, based on 100 parts by dry weight of the monomers polymerized, comprises from about 30 to about 60 percent of a soft monomer, such as, for example, butyl acrylate, ethylhexyl acrylate, butadiene or a mixture thereof, and from about 40 to about 70 percent of a hard monomer, such as, for example, methyl methacrylate, styrene or a mixture thereof. Desirably, a soft monomer whose homopolymer has a Tg of less than about –20° C. is copolymerized with a hard monomer whose homopolymer has a Tg of greater than about 80° C.

POLYMERIZATION PROCESS

The copolymer desirably is made, for example, by charging the monomeric ingredients, water, and a surfactant (when employed) into a reaction vessel, purging the reaction vessel with an inert gas, such as, for example, nitrogen, to remove essentially all the oxygen from the reactor vessel, and heating the reactor vessel to the reaction temperature, usually from about 80° to about 100° C. When the reactor vessel reaches the desired reaction temperature, an initiator is then added to the reaction vessel, and the reaction is continued for about 2 to about 4 hours. After the reaction is completed, the reactor vessel is cooled. This synthesis yields an aqueous copolymeric composition comprising the copolymer in water. In some instances, the composition has the appearance of a milky emulsion, while in other instances it looks like a clear solution.

The process of production of the copolymer may include the use of a seed, which may be a (meth)acrylate, polystyrene or any other seed useful to control the ultimate particle size of the copolymer produced, or otherwise useful in the production thereof. In a preferred embodiment of the instant invention, up to about one weight percent of the monomer composition is polystyrene seed. As is well known in the art, the regulation of initial seed can be used to control the ultimate range of particle sizes of the copolymer produced. Useful copolymer particle sizes are in the range of from about 700 to 10,000 angstroms.

Anionic, nonionic, and amphoteric surface active compounds, that is, surfactants, can be employed in the copolymer synthesis process. However, in some instances, no surfactant is required. Exemplary anionic, nonionic, and amphoteric surfactants are SIPONATE™ A246L brand surfactant available from Rhone-Poulenc, polyoxyethylene alkyl phenol surfactants, and N,N-bis-carboxyethyl lauramine, respectively. Another useful surfactant is DOWFAX™ 2EP, the sodium salt of dodecylated sulfonated phenyl ether, which is available from The Dow Chemical Company, Midland, Mich. 48640, U.S.A.

A preferred class of surface active compounds are those in which the cation is derived from a volatile base, rather than a fixed base, such as, for example, the ammonium salt of dodecylated sulfonated phenyl ether. Generally, it is desirable that the fast hardening aqueous coating composition contain from 0 to no more than about 1 weight percent of one or more surface active compounds, and preferably that it is produced to contain from about 0.1 to about 0.5 weight percent of one or more surface active compounds.

Typical initiators include thermally generated free radical sources such as peroxydisulfates, known in the industry as persulfates, perphosphates, and hydrogen peroxide. Generally, the initiator is employed in a concentration of about 0.1 to about 2 parts per hundred parts monomer by weight (phm), and preferably in a concentration of about 0.25 to about 1.0 phm.

A preferred class of initiators are those in which the cation, if present, is derived from a volatile base, such as, for example, ammonium peroxydisulfate.

As with the surfactants and initiators, when in particular emulsion systems, it is desirable to include therein various other emulsion polymer formulation components, the preferred classes of these components will be those which do not increase the non-volatile salt load of the final composition. The term "non-volatile salt load" means those ionic components whose cation is not a volatile base-containing cation, such as, for example, sodium ion or potassium ion. Volatile base-containing cations are preferred as constituents of any ionic components for use in the fast hardening aqueous coating compositions of this invention. It is desirable that the non-volatile salt load of the fast hardening aqueous coating composition is no more than 2 weight percent, more desirable that it is no more than 1.5 weight percent, and preferable that it is from 0 to no more than about 1 weight percent.

Other components which may be useful in some compositions include dispersants, thickeners, defoamers, biocides, flame retardants, antioxidants, and UV stabilizers.

The emulsions of the present invention may also be made, for example, by a delayed addition polymerization process. Typically, the delayed addition polymerization process comprises forming a monomer mixture containing about 20 to about 80 weight percent soft monomer, about 20 to about 80 weight percent hard monomer, and 0 to about 5 weight percent olefinic carboxylic acid monomer.

Water is added to a reactor and heated, generally to about 70° C. to about 90° C., while preferably purging the reactor with an inert gas, such as nitrogen, to remove substantially all oxygen from the reactor. A catalyst is then added to the reactor. Preferably, a locus for polymerization, that is, a surfactant and/or a surfactant containing seed is added to the reactor before, simultaneously with, or after the catalyst addition to form a reactor charge. After the addition of the catalyst and locus for polymerization, the delayed addition of the monomer mixture is then commenced. The ensuing reaction forms the emulsion of the present invention. The addition of the monomer mixture typically takes up to about 4 hours. During the. delayed addition of the monomer mixture, additional catalyst is typically also added to the reactor.

In an alternative synthesis procedure, a portion, for example up to about one half of the monomer mixture, is added to the reactor at the beginning of the reaction along with the addition of the initial catalyst and/or seed and/or surfactant.

After finishing the monomer mixture addition, further catalyst is commonly added while maintaining the emulsion at the elevated reaction temperature to ensure that substantially all of the monomers polymerize. The same catalyst can be used whenever one is employed. Exemplary catalyst include, but are not limited to, t-butyl hydroperoxide, ammonium persulfate, hydrogen peroxide, and mixtures thereof.

In order to stabilize the emulsion, typically toward the end of the monomer mixture addition, the pH of the emulsion is adjusted to a value greater than about 7. Adjusting the pH to within the range of from about 7 to about 11 substantially neutralizes all olefinic carboxylic acid groups on the polymer.

The pH of the emulsion may be adjusted from about 30 minutes before to about 30 minutes after terminating the addition of the monomer mixture. Desirably, the pH adjustment occurs within about 15 minutes after terminating the monomer mixture addition.

Alternatively, the emulsion may be allowed to cool to ambient or room temperature after all the monomer mixture and catalyst have been added. Then, the pH of the cooled emulsion is adjusted. Typically, a volatile base is employed in each instance where the pH of the emulsion is adjusted.

The term "volatile base" as used herein is meant to include any organic or inorganic compound which is a weak or strong base and which has a sufficiently high vapor pressure and tendency to evaporate or otherwise volatilize out of the aqueous composition of this invention so that a pigment-containing formulation prepared from the composition has a no track time according to ASTM D711-84 of 20 minutes or less, or, in the case of the fast hardening aqueous coating composition, so that a cast film of the composition has a hardening rate measurement rating of at least 5 within 20 minutes after casting under ambient conditions of temperature up to 30° C. and relative humidity no less than 50 percent.

It is advantageous to use the volatile base component of the composition to accomplish this pH adjustment. Typically, this will require adding an amount of volatile base that is at least about 0.2 weight percent based on the weight of dry materials of the finished fast hardening aqueous coating composition. Preferably, the amount of volatile base added is at least about 0.3 weight percent, and in some cases it is preferable that the amount be at least about 0.5 weight percent.

Typically, no more than about 5 weight percent of a volatile base, based on the weight of dry materials of the composition, is added. It is preferable that the amount be about 3 weight percent or less, more preferably 2 weight percent or less, even more preferably 1.5 weight percent or less.

It is desirable for the finished composition to contain an amount of volatile base that is from about 0.2 to about 5 weight percent of the finished composition, based on the weight of dry materials of the composition. More desirably, the amount of base will be 0.2 to about 3 weight percent of the finished composition, preferably from about 0.2 to about 2 weight percent, more preferably 0.3 to about 1.5 weight percent.

Exemplary volatile bases are selected from the group consisting of amine containing bases, hydroxide-containing bases, and mixtures thereof. Dimethylamine, diethylamine, aminopropanol, ammonium hydroxide, and 2- amino-2-methyl-1-propanol are typical bases, with the more volatile bases being more desirable, and ammonium hydroxide being preferred. In a preferred embodiment, the composition comprises from about 0.3 to about 1.5 weight percent of a volatile base.

In another embodiment, in which it is desirable to have a minimal volatile base content, a limited amount of a fixed based may be used in the composition, generally from about 0.1 to about 1.0 weight percent, based on the weight of dry materials of the composition, and preferably from about 0.1 to about 0.7 weight percent. This may be accomplished through the addition of a fixed base in the emulsion process or the neutralization process, or as a result of the use of some polymerization component in salt form in which the cation is not volatile, such as, for example, the sodium salt of an anionic surfactant, followed after polymerization by pH adjustment with a volatile base. Desirable fixed bases for use in this invention include sodium and potassium hydroxides, sodium hydroxide being preferred.

When a fixed base is used in the composition, the amount of the volatile base used generally is considerably reduced from what it would be otherwise, typically, to about 2 weight percent or less, preferably about 1.5 weight percent or less, more preferably about 1 weight percent or less.

In some cases the relatively strong odor of ammonia associated with a composition containing a relatively high concentration of ammonia may be undesirable. In this circumstance, it may be possible to reduce the ammonia content by using a volatile base component that is a mixture of volatile bases, such as, for example, a mixture of ammonium hydroxide (ammonia) and a less volatile organic base, such as, for example, aminomethylpropanol.

Typically, the organic base of the mixed volatile base would be at least about 0.25 weight percent, desirably up to about 0.5 weight percent, but probably not more than about 1 weight percent. As with the addition of small amounts of fixed base containing compositions, those with a mixed volatile base would require a lesser amount of ammonium hydroxide than if it were the sole base, typically, about 2 weight percent or less, preferably about 1.5 weight percent or less, more preferably about 1 weight percent or less.

The addition of the volatile base component as described above results in an increase in the pH of composition sufficient that the pH of the finished fast hardening aqueous coating composition has a pH that is at least about 8, desirably at least about 9, preferably at least about 9.5, and more preferably at least about 9.8. It is not necessary, and generally is not desirable, for the pH of the composition to be greater than about 11, and, preferably, the pH of the composition is about 10.8 or less, more preferably, about 10.5 or less. Thus, the desirable pH range for the finished aqueous coating compositions, including the fast hardening aqueous coating compositions, is from about 8 to about 11, more desirably from about 9.5 to about 10.8 and preferably from about 9.8 to about 10.5.

The polymerization process yields a preferred embodiment of the aqueous emulsion of the present invention. pH adjustment at the end of the process provides the second of the essential elements of the fast hardening aqueous coating composition, which is then ready for the addition of the third component, the polyimine. The solids content of the emulsion is generally at least about 40 weight percent, preferably in the range of about 45 to about 70 weight percent, and more preferably in the range of from about 45 to about 60 weight percent. These numbers are not greatly affected by the addition of the polyimine, since it typically is added as an aqueous solution, about 50 weight percent of which is the polyimine.

Suitable latexes can be produced using conventional emulsion polymerization techniques. Thus, for example, the monomers to be employed in the particular latex involved are typically dispersed, with agitation sufficient to emulsify the mixture, in an aqueous medium which may contain known emulsifying agents such as surfactants as well as other ingredients conventionally employed in the art as polymerization aids, including conventional chain transfer agents. Such monomers are then subjected to polymerization with the aid of a conventional source for generating free radicals, including conventional free radical polymerization catalysts, activating radiation, or other means.

Free radical polymerization catalysts suitable for use in the foregoing polymerizations include those already known to promote emulsion polymerization. Among such catalysts are oxidizing agents such as organic peroxides such as t-butyl hydroperoxide and cumene hydroperoxide inorganic oxidizing agents such as hydrogen peroxide, potassium persulfate, sodium persulfate, ammonium persulfate and catalysts which, like redox catalysts, are activated in the water phase, for example, by a water-soluble reducing agent.

Such catalysts are employed in an amount sufficient to cause polymerization, that is, in a catalytic amount. As a general rule, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents which can be employed include the anionic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali, metal alkyl sulfates, the sulfonate alkyl esters, the fatty acid soaps, and the like. Specific examples of those well-known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate, and dioctyl sodium sulfosuccinate, and, preferably, the corresponding ammonium salt forms. Such emulsifying agents can be employed in varying amounts so long as adequate emulsification is achieved to provide dispersed polymer particles having the desired particle size and particle size distribution. However, as a general rule, an amount ranging from about 0.01 to about 5 weight percent, based upon the total monomer to be polymerized is advantageously employed.

Conventional chain transfer agents can also be employed in the production of latexes and, indeed, in polymerization stages employing an aliphatic conjugated diene, it is preferable to do so. Examples of such long chain mercaptans are, for example, lauryl mercaptan, dodecyl mercaptan, and other known chain transfer agents.

Other ingredients known in the art to be useful for various specific purposes in emulsion polymerization can also be employed in the aforementioned latexes, for example, when the polymerizable constituents for a given latex include a monoethylenically unsaturated carboxylic acid monomer, polymerization under acidic conditions, that is the aqueous media having pH value of from about 2 to 7, especially from about 2 to about 5, is preferred. In such instances, the aqueous medium can include acids and/or salts to provide the desired pH value and possibly a buffered system.

The latexes can be prepared by conventional emulsion polymerization techniques. Water and a seed latex or a micelle-forming surfactant are introduced into a reactor equipped with pumps to deliver monomer and aqueous feeds. The reactor is purged with nitrogen and heated. Over a period of several hours, the monomer streams are added as well as a stream containing water, aqueous surfactant, and polymerization initiator. Following the addition of the monomer streams and the aqueous streams, the reaction mixture is maintained at the reaction temperature for additional reaction time to ensure extensive reaction before cooling. The latex may be then steam distilled to reduce the concentration of unreacted monomers.

Latex A

Into a glass lined stainless steel jacketed reactor was charged a mixture of 2139 g (70.6 parts active/100 parts monomer) of deionized water, 21.0 g (0.21 parts) of 29.8 percent active polystyrene seed having an average diameter of approximately 280 angstroms, and 121 g (0.04 parts) of a 1 percent solution of a chelating agent, VERSENOL™ 120, in water. VERSENOL™ 120 is the trisodium salt of hydroxyethylenediaminetriacetate and is available from The Dow Chemical Company, Midland, Mich. 48640, U.S.A. The reactor was purged with nitrogen and heated under agitation to 87° C. A mixture of 1605 g (53 parts) of methylmethacrylate, 60.6 g (2 parts) of methacrylic acid, and 1363 g (45 parts) of butyl acrylate was added to the reactor over 180 minutes. 757 g (25 parts) of deionized water, 33.6 g (0.5 parts) of a 45 percent solution of DOWFAX™ 2EP in water, 13.6 g (0.45 parts) ammonium persulfate and 18.4 g (0.17 parts) of ammonium hydroxide were added to the reactor over 240 minutes. DOWFAX™ 2EP is the sodium salt of dodecylated sulfonated phenyl ether and is available from The Dow Chemical Company, Midland, Mich. 48640, U.S.A. The reactor was maintained at 87° C. for the duration of the additions and for an additional 30 minutes.

For more information related to the production of copolymer-containing emulsion polymer compositions and formulations see *Emulsions: Theory and Practice*, by P. Becher Reinhold, New York (1959), *High Polymer Latices*, by D.C. Blackley, Palmerton Publishing Co., New York (1966), and *Emulsion Polymer Technology*, by Robert D. Athey, Jr., Marcel Dekker, Inc. New York (1991).

Numerous other copolymers and copolymer-containing latexes can be utilized in the composition of the instant invention, for example, as disclosed in U.S. Pat. Nos. 5,201,948; 5,213,901; 5,198,492; 5,185,396; 5,182,327; 5,173,534; 5,212,251; 5,059,456; 4,293,476; 4,666,777; 4,658,003; 4,742,108; 4,644,032; 4,623,678; 4,087,572; 4,012,355; 5,236,991; 5,157,084; 5,045,576; 4,973,670; 4,972,018; 4,968,740; 4,962,154; 4,863,979; 4,857,631; 4,806,207; 4,508,869,; 4,733,005; and 4,707,221; all of which are hereby incorporated by reference.

BLENDS

While the compositions of this invention comprise a copolymer, and for some compositions a single copolymer is used, it is within the scope of the invention to employ blends of copolymers along with the other elements of the composition. A preferred embodiment of the instant invention comprises a single copolymer along with the other elements of the composition.

When a blend of copolymers is employed rather than a single copolymer, it is not necessary that each of the copolymers have a Tg within the range of from about 0° C. to about 40° C. Rather, it is desirable for one or more of the copolymers of the blend to be capable of film formation at ambient temperatures, while one or more other copolymers of the blend may be harder, that is, the Tg's of the non-film forming copolymers may be greater than about 40° C. For this component of the blend, it is possible for the Tg to be up to 50° C., to be up to 60° C., to be up to 70° C., to be up to 80° C., to be up to 90° C., to be up to 100° C., or even to be up to 130° C.

If the primary film forming copolymer of the composition has its Tg in the preferred range, it is possible to utilize one or more other film forming copolymers with Tg's either within the preferred range or somewhat below it, for example, as low as −10° C., or even as low as −20° C. Generally, this blend of copolymers would be less preferred than a blend which includes a hard copolymer.

The Polyimine

Polyimines are polymers produced by the polymerization of imine monomers which do not contain carbon-carbon ethylenic unsaturation, but, rather, contain either carbon-nitrogen unsaturation or exist as heterocyclic ring compounds. As a result, polyimines have nitrogen atoms in the polymer backbone. Depending upon the pH of the system, these nitrogen atoms in the backbone of the polymer may be protonated, just as would the nitrogen atom of an amine group attached to a polymer. However, because of the placement of the nitrogen atom in the polymer backbone, there are significant differences from pendant amine chemistry.

Suitable polyimines for use in the fast hardening aqueous coating composition of this invention include, for example, polyethylenimines and polypropylenimines, desirably with a molecular weight of at least about 250, preferably with a molecular weight of at least about 400, more preferably with a molecular weight of at least about 700. When lower molecular weight polyimines are used as constituents of the fast hardening composition, the rate of hardening is reduced.

The molecular weight of the polyimine should be no greater than about 20,000, desirably, no greater than about 10,000, more desirably no greater than about 5,000, preferably no greater than about 3000, and more preferably no greater than about 2000. When higher molecular weight polyimines are used as constituents of the fast hardening composition, the viscosity of the composition is increased and the compositions are more difficult to use.

Preferred ranges for the molecular weight of the polyimine component of the composition are from about 250 to about 20,000, desirably from about 400 to about 10,000, more desirably from about 400 to about 3000, and preferably from about 700 to about 2000.

Preferred polyimines for use in the composition of the instant invention include polyethylenimine (PEI) that is made up of about 35 ethylenimine (EI) units, with the result that it has a molecular weight of about 2000. The material is available from BASF as POLYMIN™ G-35, CAS No. 9002-98-6, and is supplied as a 50 percent solution in water. Other commercially available PEI's are those with an average of 10 EI units, POLYMIN™ FG, and 20 EI units, POLYMIN™ G-20.

The molecular weights of these PEI's have been determined by standard gel permeation chromatographic (GPC) characterization based on narrow distribution polyethylene glycol and polyethylene oxide calibration standards, which yields a number average molecular weight. The molecular weights of the PEI's have also been determined by light scattering techniques, which yield weight averages in close agreement with the GPC result. This indicates that there is a high degree of monodispersity and a narrow Gaussian molecular weight distribution for these PEI's.

For materials for use in the composition of this invention, when there is less than close agreement between various methods of molecular weight determination, those methods which provide a number average molecular weight are preferred, with GPC being more highly preferred.

The fast hardening aqueous coating composition of this invention is prepared by mixing the polyimine with the anionically stabilized aqueous emulsion to which the volatile base has been added as discussed above. This can be accomplished in any convenient manner, but addition of the polyimine as an aqueous solution, preferably about 50 weight percent polyimine, is advantageous.

Hardening Rate Measurement

The term "fast hardening aqueous coating composition" as used herein is defined as a composition wherein a cast film of the composition has a hardening rate measurement rating of at least 5 within 20 minutes after casting under ambient conditions of temperature up to 30° C. and relative humidity no less than 50 percent.

A film of the composition to be tested is cast on a glass surface with a 0.51 mm (20 mil) draw down bar. The hardening rate for the composition is then determined by finger testing of the drying films under ambient conditions of temperature up to 30° C. and relative humidity no less than 50 percent. This test must be performed in still air. The composition is rated every 10 minutes on a rating scale of 1 to 8 as follows:

1. Wet composition, flows easily.
2. Skin over wet composition, skin is sticky.
3. Thick paste, composition does not flow.
4. Composition is slightly hard, very thick paste.
5. Composition is not sticky or wet, but is receptive to fingerprint with soft pressure, soft when twisted or gouged.
6. Composition is receptive to fingerprint only with firm pressure.
7. Composition is hard, is not receptive to fingerprint, is cloudy/white.
8. Composition is hard and clear.

TABLE I

| Example | Composition | Hardening Rate Measurement Rating (minutes) | | | | | | | |
|---|---|---|---|---|---|---|---|---|---|
| | | 0 | 10 | 20 | 30 | 40 | 50 | 60 | 70 |
| L1 | Rohm and Haas E2706 | 1 | 2 | 3 | 4 | 6 | 6 | 7 | 7 |
| L2 | MMA/BA/MAA (53/45/2) 1 pt G-35 | 1 | 5 | 5 | 6 | 6 | 7 | 7 | 7 |
| L3 | MMA/BA/MAA (53/45/2) no PEI | 1 | 1 | 1 | 2 | 2 | 4 | 7 | 7 |
| L4 | MMA/BA/0 acid (47.5/52.5/0) 1 pt G-35 | 1 | 4 | 6 | 6 | 7 | 7 | 7 | 7 |
| L5 | MMA/BA/MAA (51.5/46.5/2) 1 pt G-35 | 1 | 6 | 7 | 7 | 7 | 7 | 7 | 7 |
| L6 | MMA/BA/MAA (51.5/46.5/2) 1 pt G-35 + 0.6 NaOH | 1 | 3 | 5 | 6 | 6 | 7 | 7 | 7 |
| L7 | MMA/BA/AA(52/47/1) 1 pt G-35 | 1 | 5 | 6 | 7 | 7 | 7 | 7 | 7 |
| L8 | MMA/BA/AA (52/47/1) no PEI | 1 | 1 | 3 | 3 | 5 | 6 | 7 | 7 |
| L9 | Sty/Ba/AA (47/50/3) 1 pt G-35 | 1 | 1 | 2 | 5 | 6 | 6 | 7 | 7 |
| L10 | Sty/BA/AA (48/50/2) 1 pt G-35 | 1 | 5 | 6 | 6 | 7 | 7 | 7 | 7 |
| L11 | Sty/Buta/AA (68/30/2 + 0.5 tddm) 1 pt G-35 | 1 | 5 | 6 | 6 | 7 | 7 | 7 | 7 |

*MMA = methyl methacrylate
BA = butyl acrylate
MAA = methacrylic acid
AA = acrylic acid
sty = styrene
Buta = butadiene
tddm = t-dodecyl mercaptan Table 1 shows hardening rate measurement rating for various fast hardening aqueous coating compositions, and for various comparisons. Latex A, the synthesis of which was described previously, was used in composition Example L2. The other latexes used in the compositions were prepared in similar fashion to Latex A, but with the monomer compositions shown in Table 1. The composition ratios for the ethylenically unsaturated monomers of the polymerization mixtures are given in terms of weight percent based on the total weight of all ethylenically unsaturated monomers in the polymerization mixture. The other ingredients of a composition are listed in terms of parts by weight based on the total weight of all ethylenically unsaturated monomers in the polymerization mixture being 100 parts. Thus, composition Examples L2 and L4 through L7 each contain about 98 weight percent on a dry basis of an anionically stabilized aqueous emulsion of a copolymer (Latex), about 1 weight percent on a dry basis of ammonia to bring the pH to 10.5 and about 1 weight percent, indicated on Table 1 as 1 pt, on a dry basis of polyethylenimine with a molecular weight of 2000. When it was attempted to prepare a similar composition with a PEI having a molecular weight of 50,000, the composition coagulated. A composition was prepared using a PEI with a molecular weight of 25,000, but the composition was excessively thick.

Composition L1 is a composition commercially available from Rohm and Haas designated E-2706 containing a 55/45 methyl methacrylate/butyl acrylate copolymer with a Tg of 25° C. and ammonia.

A comparison of the hardening rate measurement ratings for L1, the prior art composition, with L2, L4, L5, L6, L7, L10 and L11 shows that the compositions of this invention have faster ratings. L3 and L8 with no PEI harden very slowly, with the composition containing the copolymer with greater acid monomer content, L3, being the slowest. L4 shows results for a composition with a latex containing a copolymer with zero acid monomer content. L6 shows that a small amount of fixed base can be used with acceptable results, but that, in comparison to the same composition without the sodium hydroxide, L5, the performance is reduced. L9 and L10 contain styrene acrylate copolymers, with L10 having the lower acid monomer content and the better performance. L11 utilizes a styrene butadiene acrylic acid copolymer synthesized with 0.5 parts of t-dodecyl mercaptan as a chain transfer agent, and the performance is very good. For the fast hardening aqueous coating compositions of this invention it is desirable that a cast film of the composition has a hardening rate measurement rating of at least 5 within 20 minutes after casting under ambient conditions of temperature up to 30° C. and relative humidity no less than 50 percent. It is more desirable that the composition has a hardening rate measurement rating of at least 6 within 20 minutes, still more desirable that the rating is at least 7 within 20 minutes. It is preferred that a composition has a hardening rate measurement rating of at least 5 within 10 minutes, more preferred that the composition has a hardening rate measurement rating of at least 6 within 10 minutes and even more preferred that the composition has a hardening rate measurement rating of at least 7 within 10 minutes.

No Track

This test was run as per ASTM D711-84. This test was run at 22° C. and about 50 percent relative humidity (RH). The time at which no paint adhered to the roller was recorded. Shorter times indicate a faster drying paint and are preferred. For the aqueous coating compositions of this invention, it is desirable that a pigment-containing formulation prepared from the composition has a no track time according to ASTM D711-84 of 20 minutes or less, while a preferred no track time is about 12 minutes or less, and even more preferred is a time of about 9 minutes or less.

Through Dry

This test is similar to ASTM D1640 which is a standard test for drying of organic coatings at room temperature. The test films were applied on a nonporous substrate (glass or metal plate) by suitable means to give a wet film thickness of 0.38 mm (15 mils). The films were dried in a 22° C. and 95 percent relative humidity environment. The films were examined periodically by touching firmly with a finger. The time at which the film dried through was recorded. Shorter times indicate a faster drying paint and are preferred. For the aqueous coating compositions of this invention, it is desirable that a pigment-containing formulation prepared from the composition has a through dry time according to ASTM D1640 of 65 minutes or less, while a preferred no track time is about 50 minutes or less, and even more preferred is a time of about 45 minutes or less.

Stormer Low Shear Viscosity

This test was run as per ASTM 562-81. This property was determined immediately after the paint was produced and again 24 hours (hrs) later. To be acceptable, the paint must have an initial viscosity of 83 to 99 KU and have a viscosity increase after 24 hrs of less than 10 KU.

Early Water Wash-off Test

The paint films for this test were prepared in the same manner as for the through dry test except that only a glass plate should be used. After the films had dried for 30 minutes (min) at 22° C. and about 50 percent RH, the samples were placed at a 90° angle under a stream of cold running water at a flow rate of 680 l/hr (180 gal/hr). The test results show the time in seconds to film breakthrough (the point at which any of the paint eroded sufficiently to see the plate below). The longer the time to failure, the better was the early water wash-off resistance. The test was stopped and the sample was considered a "pass" if five minutes of water impingement were reached without film breakthrough. For the aqueous coating compositions of this invention, it is desirable that a pigment-containing formulation prepared from the composition has an early water wash-off time of 120 seconds or more, while a preferred early water wash-off time is about 3 minutes or more, and even more preferred is a time of about 5 minutes or more.

Water Soak Test

The paint films for this test were prepared in the same manner as for the through dry test except that only a glass plate was used. After the films had dried for 6 hrs at 22° C. and about 50 percent RH, the plates were placed upright in water for 24 hours. After this period, the films were evaluated for blistering and adhesion. "Pass" indicates no blistering and complete film attachment to the plate and is the preferred result. In order of decreasing desirability; slight blister indicates the presence of a few small areas of film detachment from the plate, blister indicates the presence of numerous large areas of film detachment from the plate, and no adhesion indicates that the paint film has detached from the plate. For the aqueous coating compositions of this invention, it is desirable that a pigment-containing formulation prepared from the composition pass the water soak test.

Film Release Threshold

The paint films for this test were prepared in the same manner as for the through dry test except that only glass plates were used. After the films had dried for 72 hrs at 22° C. and about 50 percent RH, they were placed in water for 20 minutes. The force needed to remove the film from the plate with a razor blade held at a 30 degree angle to the film was measured. A high value indicates stronger adhesion and is preferred. For the aqueous coating compositions of this invention, it is desirable that a film of a pigment-containing formulation prepared from the composition has a film release threshold of about 0.3 kg or greater, preferred that the release threshold is about 0.45 or greater, more preferred that the release threshold is about 1.50 or greater, and even more preferred that the release threshold is about 2.50 or greater.

Pigment containing coating compositions were prepared using the fast hardening aqueous coating compositions of this invention, which contain a polyimine, and comparative pigment containing coating compositions with various polyamines. Three different molecular weight poly (ethylenimine) (PEI) polymers were used. Each was purchased from BASF. These were POLYMIN™ G-35 with a molecular weight of 2000, LUPASOL™ G-20 with a molecular weight of 1200, and POLYMIN™ FG with a molecular weight of 700.

The polyamine used for comparison was poly (dimethylaminoethylmethacrylate)(DMAEMA). Two different molecular weight DMAEMA polyamines were produced and tested. Both were produced as per Example C of U.S. Pat. No. 4,119,600. The lower molecular weight DMAEMA, sample 2252, used as the initiator system 4.19 g of tertiary-butyl hydroperoxide and 6.0 g of sodium formaldehyde sulfoxylate.2H$_2$O. The higher molecular weight DMAEMA, sample 2242 used as the initiator system 0.54 g of tertiary-butyl hydroperoxide and 0.75 g of sodium formaldehyde sulfoxylate.2H$_2$O.

Latex 1 was a butyl acrylate/methyl methacrylate/acrylic acid (47/52/1) copolymer with a glass transition temperature of 20° C. and a particle size of 2150 angstroms. Latex 2 was a styrene/butyl acrylate/acrylic acid (48.3/50/1.7) copolymer with a glass transition of 19° C. and a particle size of 1600 angstroms. Latexes 1 and 2 were prepared by the method described earlier for Latex A, but with variations in the monomer composition. Rohm and Haas latex, E-2706, is a well-known product used in traffic marking paints.

For those examples which employ one of the fast hardening aqueous coating compositions of this invention, ammonia and a polyimine were added to the latex as postadds to produce the fast hardening aqueous coating composition. The ammonia in an amount which varied between 0.1 and 1.6 parts (pts.) active per 100 parts of solid latex was always added first. After the ammonia was thoroughly mixed into the latex, the polyimine was added as a 50 percent solution in water. The level of polyimine varied between 1.0 and 1.5 pts.

Four different paint formulations were used in the examples. These were taken from the paint specifications of various state Departments of Transportation. They were the state of Missouri (MO) Yellow paint, the state of Missouri White paint, the state of Wyoming (WY) Yellow paint, and the state of Wyoming White paint. The paints were prepared as shown in the four standard formulations below. Table 2 presents information related to various materials used in these formulations.

TABLE 2

| Trade Name | Function | Chemical Name | Supplier |
| --- | --- | --- | --- |
| MO Yellow | | | |
| TROYSAN ™ 192 | biocide | 2(hydroxymethyl)amino-2-methyl propanol | Troy Chemical |
| DREW ™ L-493 | defoamer | silica in mineral oil | Ashland Chemical |
| COLLOIDS ™ 226/35 | dispersant | sodium polyacrylate | Rhone-Poulenc |
| TRITON ™ CF-10 | surfactant | aryl alkyl polyether | Union Carbide |
| Yellow 1244 | organic pigment | CI #65 | Engelhard Corporation |
| YLO ™ 1888D | pigment | yellow iron oxide | Harcros Pigment |
| Ti-PURE ™ R-900 | pigment | titanium dioxide | DuPont |
| NATRASOL ™ 250 HBR | thickener | hydroxyethyl cellulose | Auqualon |

TABLE 2-continued

| Trade Name | Function | Chemical Name | Supplier |
|---|---|---|---|
| MISS. LIME M-60 ™ | pigment | calcium carbonate | Mississippi Lime |
| HUBER ™ Q-6 | pigment | calcium carbonate | Huber Corporation |
| TEXANOL ™ | coalescent | 2,2,4-trimethyl-1,3-pentanediol | Eastman Chemical |
| MO White | biocide | 1-(3-chloroallyl)-3,5,7-triaza-1-azoniaadamantane chloride | The Dow Chemical Company |
| DOWICIL ™ 75 | | | |
| WY Yellow | dispersant | ammonium polyacrylate | Rohm and Haas |
| TAMOL ™ 901 | | | |
| SURFYNOL ™ CT-136 | surfactant | proprietary nonionic surfactant | Air Products |
| Yellow 1250 | organic pigment | CI #65 | Engelhard Corporation |
| OMYACARB ™ 5 | | calcium chloride | Omya |

The ingredients listed as initial components were added under mild agitation. After all of the initial components were added, the paint was mixed at low speed for 3 minutes. The speed of agitation was then increased and the ingredients listed as grind components were added. After all the grind components were added, the paint was ground at high speed for 4 minutes. The agitation was reduced and the ingredients listed as letdown components were added. After all the letdown components were added, the paint was mixed at moderate speed for 3 minutes.

| | QUANTITY (g) |
|---|---|
| MISSOURI YELLOW | |
| INITIAL COMPONENTS | |
| LATEX (50% SOLIDS) | 400 |
| TROYSAN ™ 192 (TROY CHEMICAL) | 1.5 |
| DREW ™ L-493 (ASHLAND CHEMICAL CO.) | 4 |
| COLLOIDS ™ 226/35 | 10 |
| TRITON ™ CF-10 (ROHM & HAAS CO.) | 2 |
| HARSHAW ™ 1244 (ENGLEHART CORP.) | 50 |
| YLO ™ 1888D (HARCROS) | 2 |
| Ti-PURE ™ R-900 (DU PONT) | 40 |
| NATRASOL ™ 250 HBR (AQUALON) | 0.3 |
| WATER | 23 |
| GRIND COMPONENTS | |
| MISSISSIPPI ™ LIME M-60 | 125 |
| HUBER ™ Q-6 | 450 |
| LETDOWN COMPONENTS | |
| LATEX (50% SOLIDS) | 127 |
| DREW ™ L-493 (ASHLAND CHEMICAL CO.) | 1 |
| METHANOL | 28 |
| DREW ™ L-493 (ASHLAND CHEMICAL CO.) | 1 |
| TEXANOL ™ (EASTMAN CHEMICAL) | 23 |
| MISSOURI WHITE | |
| INITIAL COMPONENTS | |
| LATEX (50% SOLIDS) | 400 |
| DOWICIL ™ 75 (THE DOW CHEMICAL CO.) | 0.5 |
| DREW ™ L-493 (ASHLAND CHEMICAL CO.) | 3 |
| COLLOIDS ™ 226/35 | 8 |
| TRITON ™ CF-10 (ROHM & HAAS CO.) | 2 |
| Ti-PURE ™ R-900 (DU PONT) | 100 |
| NATRASOL ™ 250 HBR | 0.5 |
| WATER | 16 |
| GRIND COMPONENTS | |
| MISSISSIPPI ™ LIME M-60 | 150 |
| HUBER ™ M-6 | 430 |
| LETDOWN COMPONENTS | |
| LATEX (50% SOLIDS) | 135 |
| DREW ™ L-493 (ASHLAND CHEMICAL CO.) | 1 |
| METHANOL | 29 |
| DREW ™ L-493 (ASHLAND CHEMICAL CO.) | 1 |
| TEXANOL ™ (EASTMAN CHEMICAL) | 24 |
| WYOMING YELLOW | |
| INITIAL COMPONENTS | |
| LATEX (50% SOLIDS) | 453.5 |
| DOWICIL ™ 75 (THE DOW CHEMICAL CO.) | 0.5 |
| DREW ™ L-493 (ASHLAND CHEMICAL CO.) | 2 |
| COLLOIDS ™ 226/35 | 10 |
| TAMOL ™ 901 (ROHM & HAAS CO.) | 7.2 |
| SURFYNOL ™ CT-136 (AIR PRODUCTS) | 2.6 |
| HARSHAW ™ 1250 | 32 |
| Ti-PURE ™ R-900 (DU PONT) | 20 |
| NATRASOL ™ 250 HBR | 0.14 |
| WATER | 25 |
| GRIND COMPONENTS | |
| OMYACARB 5 (OMYA CO.) | 760 |
| LETDOWN COMPONENTS | |
| DREW ™ L-493 (ASHLAND CHEMICAL CO.) | 1.75 |
| METHANOL | 30 |
| DREW ™ L-493 (ASHLAND CHEMICAL CO.) | 1.75 |
| TEXANOL ™ (EASTMAN CHEMICAL) | 23 |
| WYOMING WHITE | |
| INITIAL COMPONENTS | |
| LATEX (50% SOLIDS) | 453.5 |
| DOWICIL ™ 75 (DOW CHEMICAL CO.) | 0.5 |
| DREW ™ L-493 (ASHLAND CHEMICAL CO.) | 2 |
| TAMOL ™ 901 (ROHM & HAAS CO.) | 7.2 |
| SURFYNOL ™ CT-136 (AIR PRODUCTS) | 2.6 |
| Ti-PURE ™ R-900 (DU PONT) | 100 |
| NATRASOL ™ 250 HBR | 0.12 |
| WATER | 24 |
| GRIND COMPONENTS | |
| OMYACARB ™ 5 (OMYA) | 760 |
| LETDOWN COMPONENTS | |
| DREW ™ L-493 (ASHLAND CHEMICAL CO.) | 1.75 |
| METHANOL | 30 |
| DREW ™ L-493 (ASHLAND CHEMICAL CO.) | 1.75 |
| TEXANOL ™ (EASTMAN CHEMICAL) | 23 |

TABLE 3

| EXAMPLE NUMBER | LATEX TYPE | LATEX I.D. | AMMONIA (pts) | IMINE AMINE | I/A (pts) | PAINT TYPE |
|---|---|---|---|---|---|---|
| P1 | ACRYL. | LATEX 1 | 1.05 | G-20 | 1 | MO/YL |
| P2 | ACRYL. | E-2706 | | | | MO/YL |
| P3 | ACRYL. | LATEX 1 | 1.05 | G-20 | 1 | MO/WH |
| P4 | ACRYL. | E-2706 | | | | MO/WH |
| P5 | ACRYL. | LATEX 1 | 1.05 | G-20 | 1 | WY/YL |
| P6 | ACRYL. | E-2706 | | | | WY/YL |
| P7 | ACRYL. | LATEX 1 | 1.05 | G-20 | 1 | WY/WH |
| P8 | ACRYL. | E-2706 | | | | WY/WH |
| P9 | ACRYL. | LATEX 1 | 1.0 | G-35 | 1 | MO/YL |
| P10 | ACRYL. | LATEX 1 | 1.0 | FG | 1.5 | MO/YL |
| P11 | S/ACRYL. | LATEX 2 | 1.6 | G-20 | 1 | MO/YL |
| P12 | ACRYL. | LATEX 1 | 1.08 | 2252 | 1.25 | MO/YL |
| P13 | ACRYL. | LATEX 1 | 1.08 | 2242 | 1.25 | MO/YL |
| P14 | ACRYL. | LATEX 1 | 0.1 | NONE | 0 | MO/YL |

TABLE 4

| EXAMPLE NUMBER | INIT. KU | 24 hr. KU | NO TRACK TIME (min.) | THROUGH DRY (min) |
|---|---|---|---|---|
| P1 | 93 | 90 | 11.8 | 42 |
| P2 | 88 | 90 | 10.2 | 53 |
| P3 | 90 | 90 | 9.0 | 62 |
| P4 | 91 | 90 | 7.2 | 68 |
| P5 | 87 | 83 | 6.0 | 44 |
| P6 | 83 | 83 | 4.0 | 69 |
| P7 | 83 | 80 | 6.0 | 45 |
| P8 | 79 | 81 | 3.0 | 65 |
| P9 | 99 | 96 | 5.5 | 48 |
| P10 | 84 | 88 | 10.5 | 47 |
| P11 | 72 | 77 | 18 | 46 |
| P12 | 83 | 87 | 16 | 43 |
| P13 | 90 | 96 | 6.5 | 30 |
| P14 | 77 | 79 | 34 | 101 |

TABLE 5

| EXAMPLE NUMBER | EARLY WATER WASHOFF (sec) | WATER SOAK TEST | FILM RELEASE THRESHOLD (kg) |
|---|---|---|---|
| P1 | 120 | PASS | 0.45 |
| P2 | 20 | NO ADHESION | 0.07 |
| P3 | PASS | PASS | 0.50 |
| P4 | 30 | NO ADHESION | 0.05 |
| P5 | PASS | PASS | 3.30 |
| P6 | 250 | NO ADHESION | 0.15 |
| P7 | PASS | PASS | 2.50 |
| P8 | BLISTERS | NO ADHESION | 0.14 |
| P9 | PASS | PASS | 1.70 |
| P10 | PASS | PASS | 0.40 |
| P11 | PASS | PASS | 4.60 |
| P12 | 20 | NO ADHESION | 0.14 |
| P13 | 30 | NO ADHESION | 0.08 |
| P14 | 10 | NO ADHESION | 0.12 |

Table 3 gives data for various paint formulations-which were subsequently used in testing. The latexes are identified and classed as either an acrylic or styrene acrylic latex. Examples P1, P3, P5, P7, and P9–P11 were prepared with a fast hardening aqueous coating composition of the instant invention containing a polyimine, identified on Table 3 under the heading "IMINE/AMINE", with the parts used under I/A. Examples P12 and P13 were prepared with the polyamines DMAEMA discussed previously. The final column of Table 3 identifies the paint formula used to prepare the example.

Tables 4 and 5 present paint test data for Examples P1–P14. Examples P1 to P8 consist of four pairs of paints and associated data. Each pair compares paints made with the latex containing polyethylenimine to those made with a standard industry fast drying latex (Rohm and Haas' E2706) in a different formulation. In each case, the through dry time is longer for the paint containing E2706 than for the other paint in the pair (Table 4). In addition, the wet adhesion as measured by all three tests shown in Table 5 is better for the paints made with the latex containing PEI. In the early water wash-off test, the time to film breakthrough is consistently shorter for the E2706 containing paints. In the water soak test, the E2706 containing paints all exhibited the worst possible results; complete loss of film adhesion. The paints made with the latex containing PEI all passed this test with no blistering or loss of adhesion. In the Film Release Threshold test, the force needed to remove the E2706 containing paints was only 5 to 15 percent of the force needed to remove the PEI containing paints. These points indicate that for each of the four pairs, the paint made with the fast hardening aqueous coating composition of this invention containing polyethylenimine is superior to the paint produced with the E2706 latex.

Comparing Examples P9 and P10 to Example P1 indicate that the molecular weight of the polyethylenimine can vary considerably and the paint will maintain adequate drying times and superior wet adhesion. Table 4 shows that the molecular weight of the PEI does influence the paint viscosity and the no track time but that all are within the bounds of acceptability. Table 5 indicates that the wet adhesion (as measured by all three tests) is excellent when any of the three PEI's with different molecular weights are used.

Example P11 uses a copolymer backbone which is different from all the other examples. This indicates that the invention described herein works for other polymer systems, such as styrene/butyl acrylate latexes. As shown in Table 4, the initial paint viscosity is very low at 72 and increases to only 77 after 24 hours. Table 5 indicates that the wet adhesion (as measured by all three tests) is excellent. Of particular note is the extremely high value of Film Release Threshold obtained in this example. Comparing Example P11 to Example P2 shows that the PEI containing paint has a film release threshold 66 times greater than the E2706 containing paint.

Several sources, including European Patent Applications 0594321A1 and 0409459A2, cite the use of DMAEMA in latex as a means of obtaining fast drying paints. In Examples P12 and P13, DMAEMA was used in the latex. By comparing these two examples to Example P1, it can be seen that the use of PEI offers significant advantages over the DMAEMA in the area of wet adhesion. When the polyethylenimine is present in the latex, the drying rate of paint is good and the wet adhesion properties are excellent. However, when the polyamine is DMAEMA, the wet adhesion is inferior.

Example P14 indicates that when no polyamine is used, the no track and through dry times are very long and the wet adhesion is also very poor.

Migration Resistant Binder

The fast hardening aqueous coating compositions of this invention can be used as fast hardening migration resistant binders for non-woven or woven fibers, which may be organic or inorganic fibers, synthetic or natural. In this application, organic or inorganic fillers may be used as well. Various combinations of the fillers and fibers can be used with the fast hardening migration resistant binders of this invention to form fast hardening migration resistant binder compositions and bonded composites. The prior art technology related to this field of use is discussed in U.S. Pat. Nos. 4,199,400 and 4,119,600, both of which are hereby incorporated by reference.

What is claimed is:

1. A fast hardening aqueous migration-resistant binder composition comprising:
    (1) a fast hardening aqueous coating composition comprising:
        (a) from about 95 to about 99 weight percent, based on the weight of dry materials in the composition, of an anionically stabilized aqueous emulsion of a copolymer having a Tg of from about 10° C. to about 50° C. the copolymer comprising in polymerized form a polymerization mixture containing two or more ethylenically unsaturated monomers, wherein, based on the total weight of all ethylenically unsaturated monomers in the polymerization mixture, from 0.2 to about 4 weight percent of the monomers are α,β-ethylenically unsaturated aliphatic carboxylic acid monomers;
        (b) from about 0.2 to about 5 weight percent of a polyethyleneimine having a number average molecular weight of from about 250 to about 2,000; and
        (c) from about 0.2 to about 5 weight percent of a volatile base; and
    (2) an organic filler, an inorganic filler, an organic fiber, an inorganic fiber, or a mixture thereof.

2. A fast hardening aqueous coating composition comprising:
    (a) from about 95 to about 99 weight percent, based on the weight of dry materials in the composition, of an anionically stabilized aqueous emulsion of a copolymer having a Tg of from about −10° C. to about 50° C., the copolymer comprising in polymerized form a polymerization mixture containing two or more ethylenically unsaturated monomers, wherein, based on the total weight of all ethylenically unsaturated monomers in the polymerization mixture, from 0.1 to about 5 weight percent of the monomers are α,β-ethylenically unsaturated aliphatic carboxylic acid monomers;
    (b) from about 0.2 to about 5 weight percent of a polyimine having a number average molecular weight of from about 250 to about 2,000; and
    (c) from about 0.2 to about 5 weight percent of a volatile base; wherein the composition has a pH from about 8 to about 11, and wherein a cast film of the composition has a hardening rate measurement rating of at least 5 within 20 minutes after casting under ambient conditions of temperature up to 30° C. and relative humidity no less than 50 percent.

3. A fast hardening aqueous coating composition comprising:
    (a) from about 95 to about 99 weight percent, based on the weight of dry materials in the composition, of an anionically stabilized aqueous emulsion of a copolymer having a Tg of from about −10° C. to about 50° C., the copolymer comprising in polymerized form a polymerization mixture containing butyl acrylate, and at least one of styrene, methylmethacrylate or a mixture thereof, and from 0.2 to about 4 weight percent of at least one of acrylic acid, methacrylic acid or a mixture thereof, based on the total weight of all ethylenically unsaturated monomers in the polymerization mixture;
    (b) from about 0.2 to about 5 weight percent of a polyethyleneimine having a number average molecular weight of from about 250 to about 2,000; and
    (c) from about 0.2 to about 5 weight percent of ammonia; wherein the composition has a pH from about 8 to about 11, and wherein a cast film of the composition has a hardening rate measurement rating of at least 5 within 20 minutes after casting under ambient conditions of temperature up to 30° C. and relative humidity no less than 50 percent.

4. The fast hardening aqueous coating composition of claim 3 wherein the polymerization mixture comprises styrene, butyl acrylate, and at least one of acrylic acid, methacrylic acid or a mixture thereof.

5. The fast hardening aqueous coating composition of claim 3 wherein the polymerization mixture comprises methylmethacrylate, butyl acrylate, and at least one of acrylic acid, methacrylic acid or a mixture thereof.

6. The composition of claim 3 wherein the copolymer consists essentially of, in polymerized form, a polymerization mixture containing butyl acrylate, at least one of styrene, methylmethacrylate or a mixture thereof, and from 0.2 to about 4 weight percent of at least one of acrylic acid, methacrylic acid or a mixture thereof.

7. A fast hardening aqueous traffic paint comprising:
    (1) a fast hardening aqueous coating composition comprising:
        (a) from about 95 to about 99 weight percent, based on the weight of dry materials in the composition, of an anionically stabilized aqueous emulsion of a copolymer having a Tg of from about −10° C. to about 50° C., the copolymer comprising in polymerized form a polymerization mixture containing two or more ethylenically unsaturated monomers, wherein, based on the total weight of all ethylenically unsaturated monomers in the polymerization mixture, from 0.2 to about 4 weight percent of the monomers are α,β-ethylenically unsaturated aliphatic carboxylic acid monomers;
        (b) from about 0.2 to about 5 weight percent of a polyethyleneimine having a number average molecular weight of from about 250 to about 2,000; and
        (c) from about 0.2 to about 5 weight percent of a volatile base; and
    (2) an organic or inorganic pigment;
    wherein the paint has a no track time according to ASTM D711-84 of 20 minutes or less.

8. The fast hardening aqueous coating composition of claim 2 wherein: in the polymerization mixture, from 0.2 to about 4 weight percent of the ethylenically unsaturated monomers are α,β-ethylenically unsaturated aliphatic carboxylic acid monomers, and the polyimine is a polyethyleneimine.

9. The fast hardening aqueous coating composition of claim 8 wherein a cast film of the composition has a hardening rate measurement rating of at least 6 within 20 minutes.

10. The fast hardening aqueous coating composition of claim 9 wherein a cast film of the composition has a hardening rate measurement rating of at least 7 within 20 minutes.

11. The fast hardening aqueous coating composition of claim 8 wherein a cast film of the composition has a hardening rate measurement rating of at least 5 within 10 minutes.

12. The fast hardening aqueous coating composition of claim 11 wherein a cast film of the composition has a hardening rate measurement rating of at least 6 within 10 minutes.

13. The fast hardening aqueous coating composition of claim 11 wherein a cast film of the composition has a hardening rate measurement rating of at least 7 within 10 minutes.

14. The fast hardening aqueous coating composition of claim 8 wherein the polymerization mixture includes from about 0.2 to about 3 weight percent of one or more α,β-ethylenically unsaturated aliphatic carboxylic acid monomers.

15. The fast hardening aqueous coating composition of claim 14 wherein the polymerization mixture includes from about 0.3 to about 2 height percent of one or more α,β-ethylenically unsaturated aliphatic carboxylic acid monomers.

16. The fast hardening aqueous coating composition of claim 15 wherein the polymerization mixture includes from about 0.4 to about 1 weight percent of one or more α,β-ethylenically unsaturated aliphatic carboxylic acid monomers.

17. The fast hardening aqueous coating composition of claim 8 wherein the polymerization mixture includes from 0.2 to about 0.5 weight percent of one or more α,β-ethylenically unsaturated aliphatic carboxylic acid monomers.

18. The fast hardening aqueous coating composition of claim 8 further comprising from 0 to about 1 weight percent of one or more surface active compounds.

19. The fast hardening aqueous coating composition of claim 18 wherein the weight of one or more surface active compounds is from about 0.1 percent to about 0.5 weight percent.

20. The fast hardening aqueous coating composition of claim 8 wherein the pH of the composition is from 9.5 to about 11.

21. The fast hardening aqueous coating composition of claim 20 wherein the pH of the composition is from 9.5 to about 10.8.

22. The fast hardening aqueous coating composition of claim 21 wherein the pH of the composition is from about 9.8 to about 10.5.

23. The fast hardening aqueous coating composition of claim 8 wherein the composition comprises from about 0.2 to about 3 weight percent of the polyethyleneimine.

24. The fast hardening aqueous coating composition of claim 23 wherein the composition comprises from about 0.3 to about 2 weight percent of the polyethyleneimine.

25. The fast hardening aqueous coating composition of claim 24 wherein the composition comprises from about 0.5 to about 1.3 weight percent of the polyethyleneimine.

26. The fast hardening aqueous coating composition of claim 8 wherein the polyethyleneimine has a number average molecular weight of from about 400 to about 2,000.

27. The fast hardening aqueous coating composition of claim 13 wherein the molecular weight of the polyethylenimine is from about 700 to about 2000.

28. The fast hardening aqueous coating composition of claim 8 wherein the composition comprises from about 0.2 to about 3 weight percent of a volatile base.

29. The fast hardening aqueous coating composition of claim 28 wherein the composition comprises from about 0.2 to about 2 weight percent of a volatile base.

30. The fast hardening aqueous coating composition of claim 29 wherein the composition comprises from about 0.3 to about 1.5 weight percent of a volatile base.

31. The fast hardening aqueous coating composition of claim 8 wherein the volatile base is ammonia or an organic amine containing up to 4 carbon atoms.

32. The fast hardening aqueous coating composition of claims 8 further comprising from about 0.1 to about 1.0 weight percent of a fixed base.

33. The fast hardening aqueous coating composition of claim 32 wherein the composition comprises from about 0.1 to about 0.5 weight percent of a fixed base and from about 0.3 to about 1.5 weight percent of a volatile base.

34. The fast hardening aqueous coating composition of claim 8 wherein the monomers of the polymerization mixture include from about 1 to 100 weight percent of one or more (meth)acrylate monomers, from about 0.1 to about 4 weight percent of one or more (meth)acrylic acid monomers, from about 1 to 100 weight percent of one or more ethylenically unsaturated monomers which are not (meth)acrylate monomers or α,β-ethylenically unsaturated aliphatic carboxylic acid monomers, from about 0.1 to 4 weight percent of one or more α,β-ethylenically unsaturated aliphatic carboxylic acid monomers which are not (meth)acrylic acid monomers, or a mixture thereof.

35. The fast hardening aqueous coating composition of claim 34 wherein the monomers of the polymerization mixture include from 1 to about 40 weight percent of one or more (meth)acrylate monomers.

36. The fast hardening aqueous coating composition of claim 34 wherein the monomers of the polymerization mixture include from about 40 to about 60 weight percent methyl methacrylate and from about 60 to about 40 weight percent butyl acrylate, and from 0.2 to about 3 weight percent of acrylic acid, methacrylic acid or a mixture thereof.

37. The fast hardening aqueous coating composition of claim 34 wherein the monomers of the polymerization mixture include from about 1 to about 70 weight percent of one or more vinyl aromatic monomers.

38. The fast hardening aqueous coating composition of claim 34 wherein the monomers of the polymerization mixture include from about 1 to about 40 weight percent of one or more monoethylenically unsaturated aliphatic monomers, one or more conjugated diene monomers or a mixture thereof.

39. The fast hardening aqueous coating composition of claim 34 wherein the monomers of the polymerization mixture comprise from about 40 to about 70 weight percent of one or more hard monomers and from about 60 to about 30 weight percent of one or more soft monomers.

40. The fast hardening aqueous coating composition of claim 39 wherein the soft monomer is characterized by having a homopolymer with a Tg of greater than about 80° C. and the hard monomer is characterized by having a homopolymer with a Tg of less than about −20° C.

41. An aqueous coating composition comprising:
(a) from about 95 to about 99 weight percent, based on the weight of dry materials in the composition, of an anionically stabilized aqueous emulsion of a copolymer having a Tg of from about −10° C. to about 50° C. the copolymer comprising in polymerized form a polymerization mixture containing two or more ethylenically unsaturated monomers, wherein, based on the total weight of all ethylenically unsaturated monomers in the polymerization mixture, from 0.2 to about 4 weight percent of the monomers are α,β-ethylenically unsaturated aliphatic carboxylic acid monomers;

(b) from about 0.2 to about 5 weight percent of a polyethyleneimine having a number average molecular weight from about 250 to about 2,000 and (c) from about 0.2 to about 5 weight percent of a volatile base;

wherein the composition has a pH from about 8 to about 11, and wherein a pigment-containing formulation prepared from the composition has a no track time according to ASTM D711-84 of 20 minutes or less.

42. The aqueous coating composition of claim 41 wherein the pigment-containing formulation prepared from the composition is a fast hardening traffic paint and the pH is from 9.5 to about 11.

43. A process for the preparation of a fast hardening aqueous coating composition comprising:

(1) preparing from about 95 to about 99 weight percent, based on the weight of dry materials in the composition, of an anionically stabilized aqueous emulsion of a copolymer having a Tg of from about −10° C. to about 50° C., the copolymer comprising in polymerized form a polymerization mixture containing two or more ethylenically unsaturated monomers, wherein, based on the total weight of all ethylenically unsaturated monomers in the polymerization mixture, from 0.2 to about 4 weight percent of the monomers are α,β-ethylenically unsaturated aliphatic carboxylic acid monomers;

(2) adding from about 0.2 to about 5 weight percent of a volatile base to the emulsion from (1) so that the pH of the emulsion is in the range from about 8 to about 11;

(3) mixing with the product from (2) from about 0.2 to about 5 weight percent of a polyethyleneimine having a number average molecular weight of from about 250 to about 2,000; wherein the composition has a pH from about 8 to about 11, and wherein a cast film of the composition has a hardening rate measurement rating of at least 5 within 20 minutes after casting under ambient conditions of temperature up to 30° C. and relative humidity no less than 50 percent.

44. The process of claim 43 wherein the emulsion in (1) is produced to contain a non-volatile salt load of from 0 to no more than 1 weight percent.

45. The process of claim 44 wherein the emulsion in (1) is produced using only volatile base-containing cations as counterions for the ionic components of the polymerization mixture or as post-adds.

46. The process of claim 43 wherein the emulsion in (1) is produced to contain from 0 to no more than about 1 weight percent of one or more surface active compounds.

47. The process of claim 43 wherein the emulsion in (1) is produced to contain from about 0.1 to about 0.5 weight percent of one or more surface active compounds.

* * * * *